United States Patent [19]
Willy

[11] Patent Number: 5,321,312
[45] Date of Patent: Jun. 14, 1994

[54] SWITCHING DEVICE

[76] Inventor: Rombaut Willy, Leopoldstraat 55, 9400 Ninove, Belgium

[21] Appl. No.: 861,891
[22] PCT Filed: Aug. 22, 1991
[86] PCT No.: PCT/BE91/00059
§ 371 Date: Jun. 22, 1992
§ 102(e) Date: Jun. 22, 1992
[87] PCT Pub. No.: WO92/03864
PCT Pub. Date: Mar. 5, 1992

[30] Foreign Application Priority Data

Aug. 28, 1990 [BE] Belgium .................. 09000824

[51] Int. Cl.$^5$ .................................. H04Q 1/30
[52] U.S. Cl. .......................... 307/125; 340/825.79
[58] Field of Search ........... 307/125, 113, 115, 132 R, 307/132 M, 139, 29; 341/22; 340/825.79

[56] References Cited

U.S. PATENT DOCUMENTS 3,562,418  2/1971  Glusick .................. 340/166
4,539,564  9/1985  Smithson .............. 340/825.79
4,630,045 12/1986  Georgiou ............. 340/825.79

FOREIGN PATENT DOCUMENTS 0119187  9/1984  European Pat. Off. .
0319235  6/1989  European Pat. Off. .

*Primary Examiner*—A. D. Pellinen
*Assistant Examiner*—Peter Ganjoo
*Attorney, Agent, or Firm*—Spencer, Frank & Schneider

[57] ABSTRACT

A switching device for an on-off switching of electrical current operable units includes a first series of first switches which are each time connected with an address generator which is connected via a bus with a branching member, which branching member is further connected with a second series of second switches on which the units are connectable. The branching member further includes a control signal generator which is connected with the address generator and which is provided for, under control of the control signals, fetching the address each time under the form of partial addresses from the address generator.

11 Claims, 9 Drawing Sheets

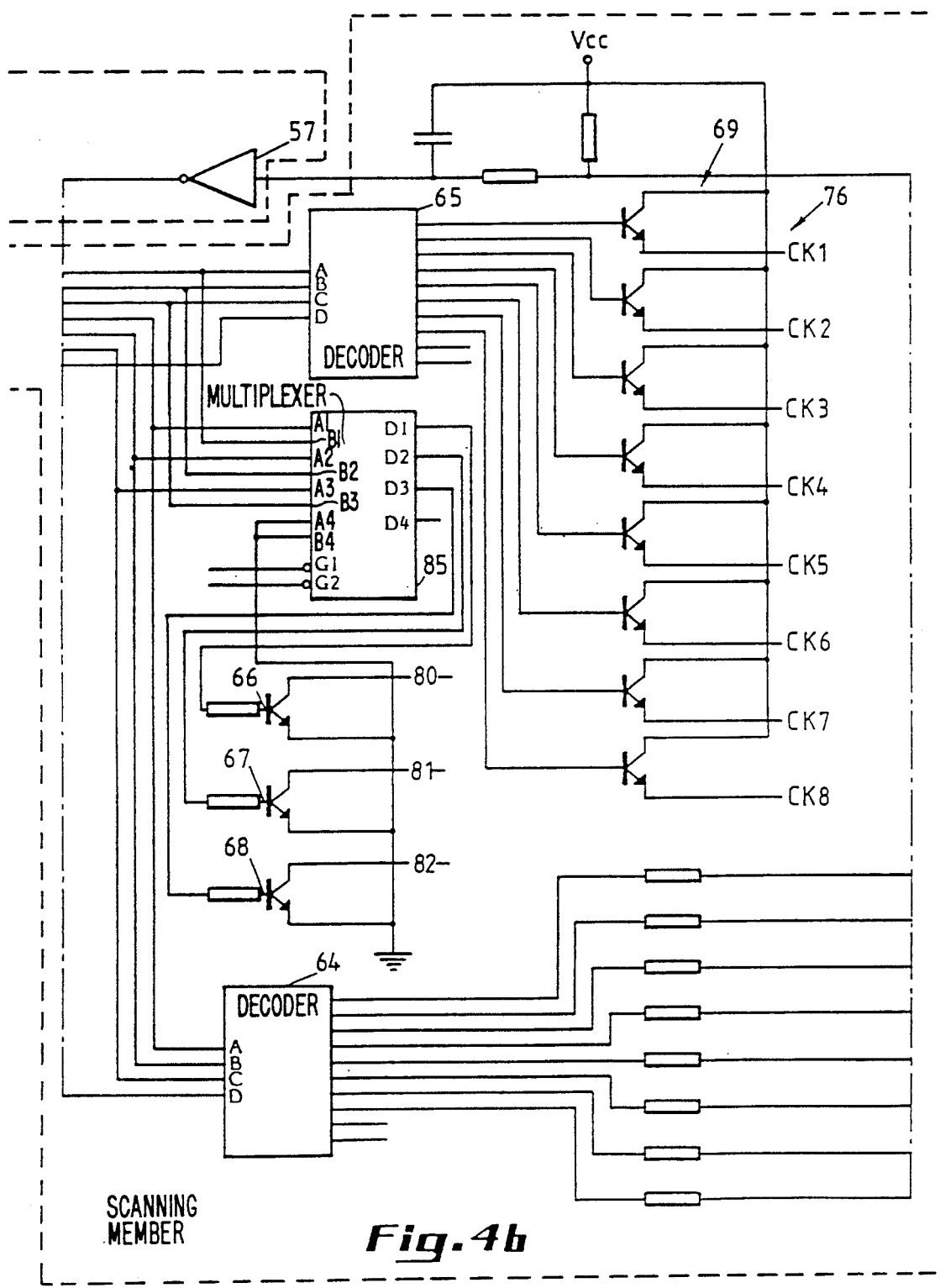

SWITCHING DEVICE

The invention relates to a switching device for an on-off switching of on electrical current operable units, in particular units connectable on the mains, comprising a first series of switches connected with a branching member which is further connected with first inputs of a second series of switches, each having a first input on which said units are connectable and a second input on which a supply source, in particular the mains, is connectable.

Such switching devices are generally applied in domestical houses or industrial plants. The units operable on electrical current are for example formed by lighting points, domestical apparatuses, machines and computers. The first series of switches are arranged either on different places or on a same place in the building, depending of the type and the destination of the building and have the purpose to control said units, in particular to switch them on and off. The switches of the first series are connected with a branching member, for example formed by a branching box or a switchboard, from which current or control signals are transmitted towards a second series of switches. This second series of switches are for example formed by relais or teleruptors which then take care that the necessary current and voltage is supplied to the units in order to provide them with the necessary electrical power.

A drawback of the known device is that, when it is necessary to control by means of a plurality of first switches a same or different units, the installation of a rather larger number of electrical wires is required which is a cumbersome activity. Moreover such a device is barely flexible and often implies for each modification the appliance of additional wires.

The object of the invention is to provide a solution for said drawbacks.

A switching device according to the invention is characterized in that said second inputs of said first series of switches are connectable on a low tension supply source and each switch of said first series is connected with at least one address generator provided for assigning an address to said switch connected thereto and corresponding with a further address assigned to the unit controlled by said switch connected thereto, which branching member is connected to a bus provided with a predetermined number (n) of transmission lines for communication between said address generator and said branching member and comprising a control signal generator connected with r ($2 \leq r < n$) of said n transmission lines which are further connected with a control input of said address generators, which address generators comprise a second output connected via the n-r remaining transmission lines with the branching member and which are provided for transmitting towards said branching member a $t^{th}$ ($1 \leq t < 2^{(r-1)}$) partial address under control of each time a $t^{th}$ control signal generated by said control signal generator, said $t^{th}$ partial address being each time formed of a $t^{th}$ part of the address generated by the address generator. By assigning an address to each switch of the first series and by further transporting the address over a bus with a predetermined number of transmission lines there is obtained, on the one hand, a reduced number of wires between the first switches and the branching member and, on the other hand, a very flexible device whereby a modification to be applied can easily be realized by assigning another address. By further using $2^{r-1}$ control signals the addressing capabilities can be enlarged without requiring additional wires.

A first preferred embodiment of a switching device according to the invention is characterized in that the number r of transmission lines equals two. Due to this, the number of address possibilities is enlarged by using a simple two-bits control signal.

A second preferred embodiment of a switching device according to the invention is characterized in that said second series of switches are disposed according to a matrix and there is assigned to each switch of said second series a matrix address indicating a row and a column of said matrix, and wherein said branching member is provided for converting a received address in a corresponding matrix address. Conversion towards a matrix address is easy and can be realized with only a few components.

Advantageously, said address generator comprises a programmable memory. A modification can then very easily be applied by programming the new address, which, as the case may be, can be realized by the users himself and which thus renders an intervention of an electrician no longer necessary.

A third preferred embodiment of a switching device according to the invention is characterized in that said switching device comprises a control pulse generator provided for generating a first respectively a second control pulse for the switching of all connected units in a first respectively a second position, which control pulse generator comprises a third output connected with a third input of a scanning member connected with said switching member and said first input of the second series of switches, which scanning member is provided for generating under control of a received control pulse a series of scanning signals for sequentially scanning each of the switches from said second series in order to generate each time a scanning pulse representing the position of the scanned switch, which scanning member is connected with a fourth input of a comparison member a fifth input of which being connected with said switches of the second series and a sixth input being provided for receiving said first and second control pulse, which comparison member being provided for comparing for each scanned switch said scanning pulse with the control pulse presented at its fifth input and for generating a first respectively a second comparison signal by correspondence respectively non-correspondence of the compared pulses, which comparison member being provided for activating said branching member under control of a second comparison signal for switching over the scanned switch. This enables to branch in a same position and originating from a same switching unit, all connected units, independently of the position in which they were.

Preferably said scanning member comprises a counter for generating as a scanning signal subsequent addresses assigned to said first switches. This enables a simple realization.

A fourth preferred embodiment of a switching unit according to the invention is characterized in that said control pulse generator comprises an alarm detector. The alarm unit is thus able to switch on all light points by detection of a burglary.

The invention will now be described by means of an exemple shown in the drawings.

Figure 5:
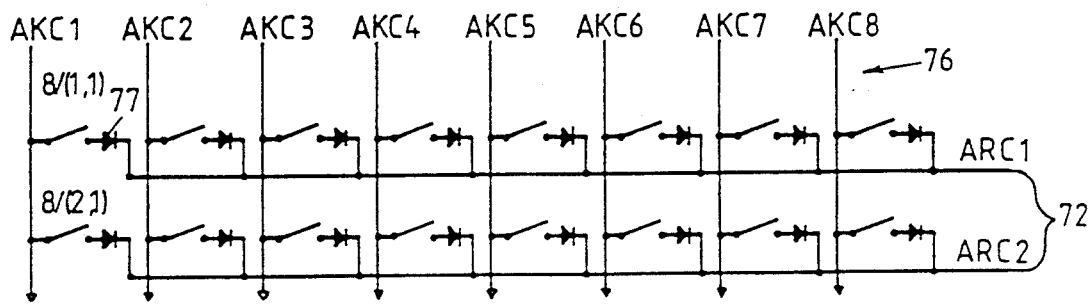
Figure 3A:
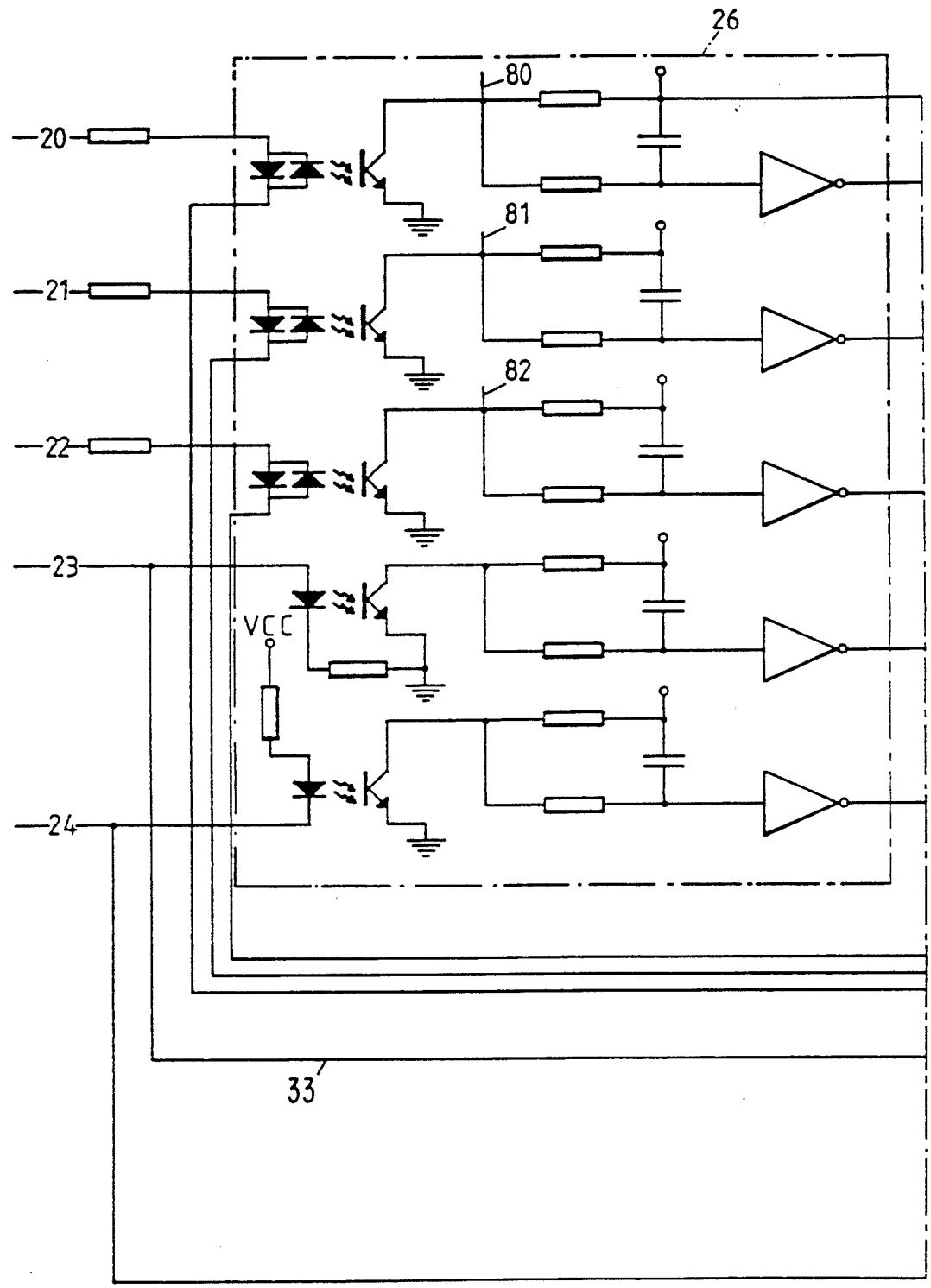
Figure 3B:
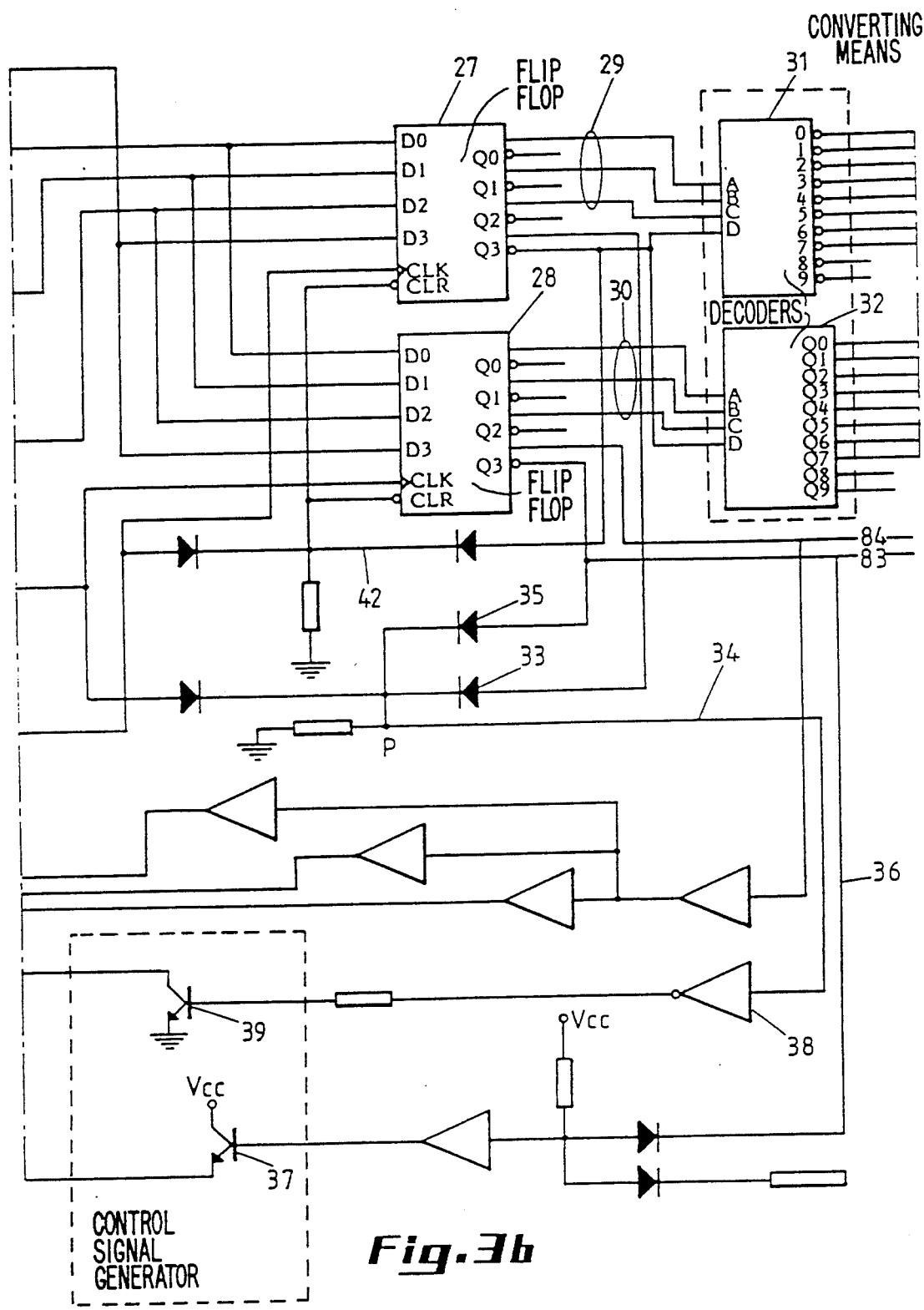
Figure 3C:
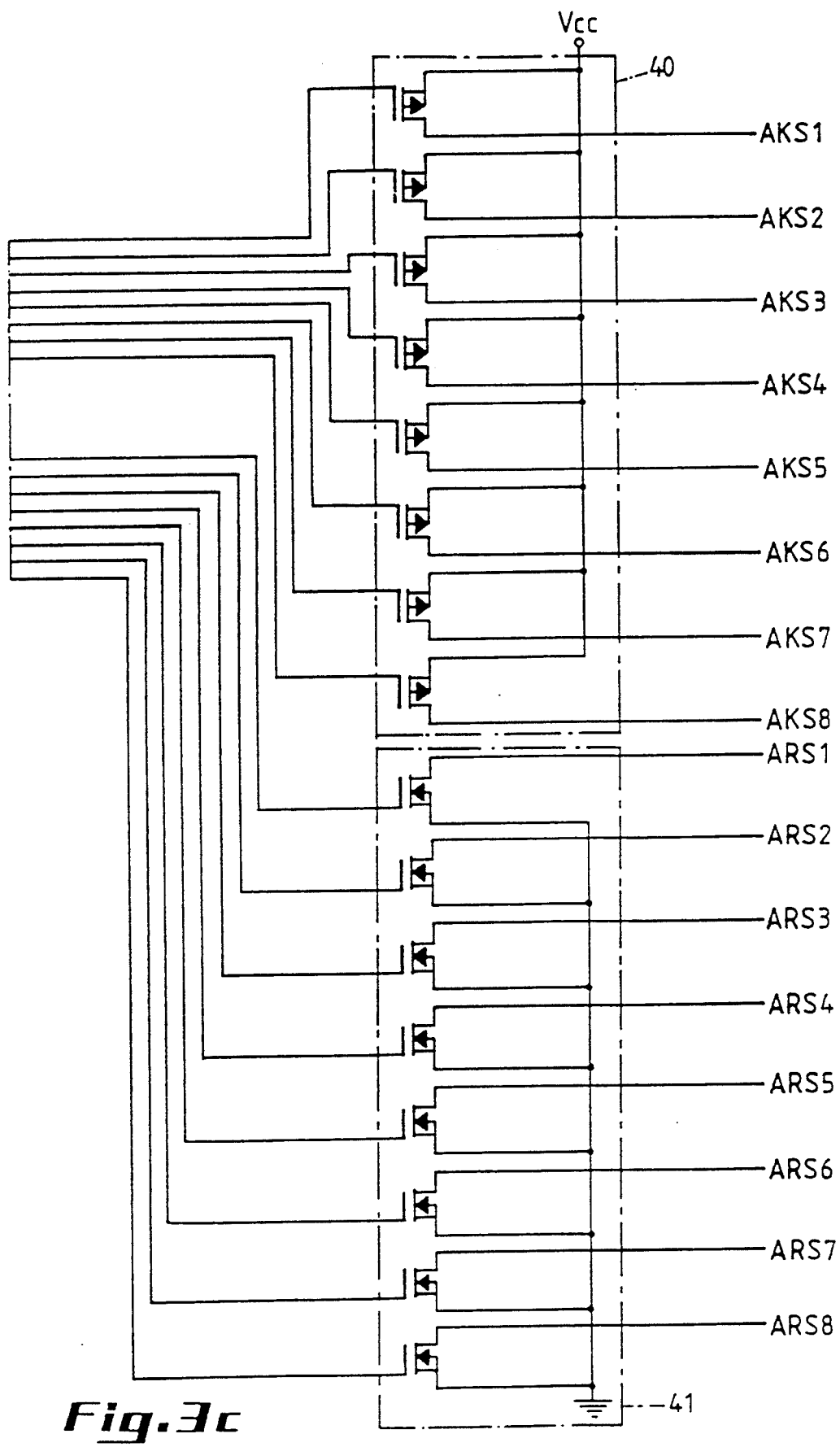
Figure 4A:
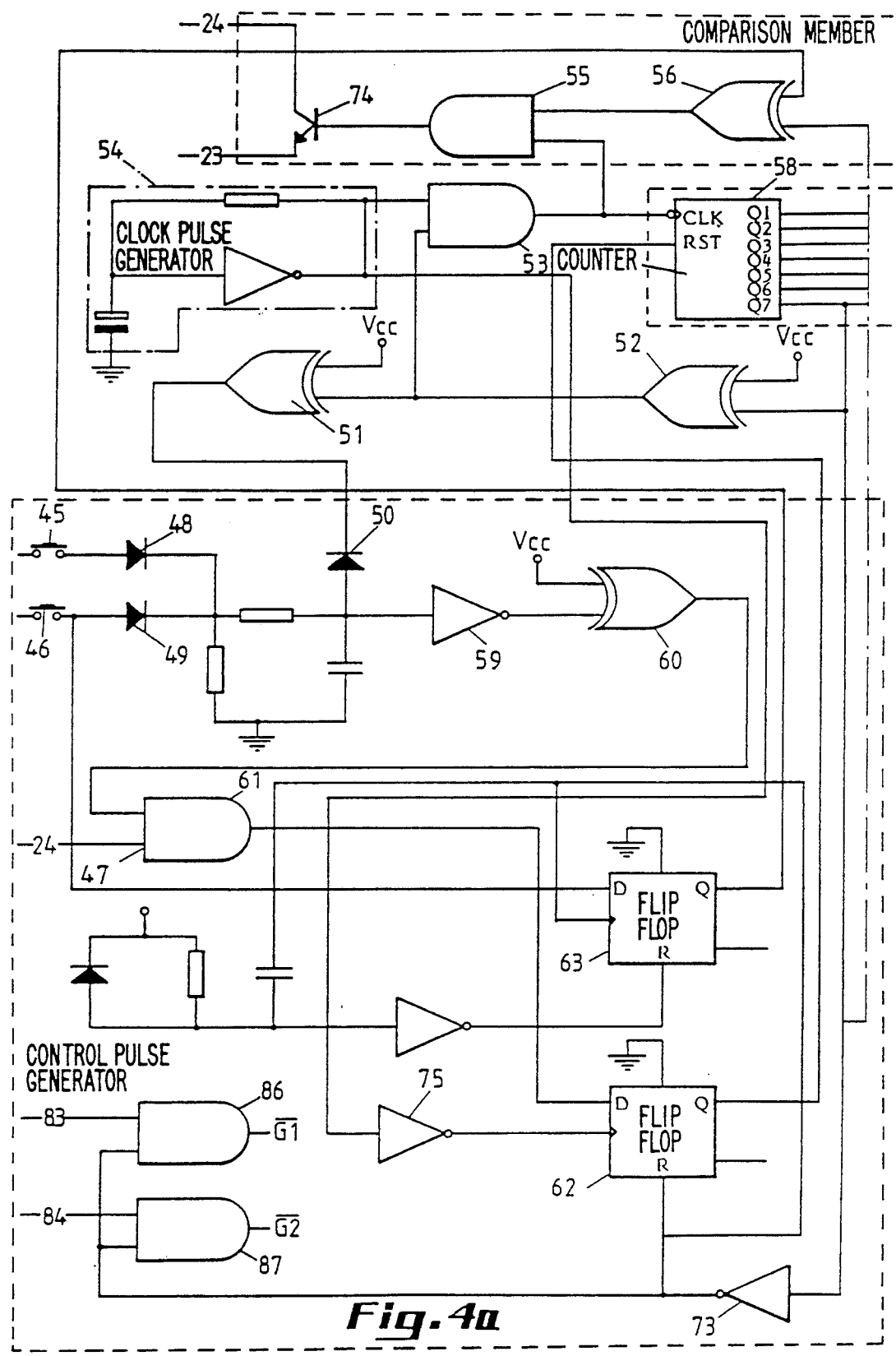
Figure 4C:
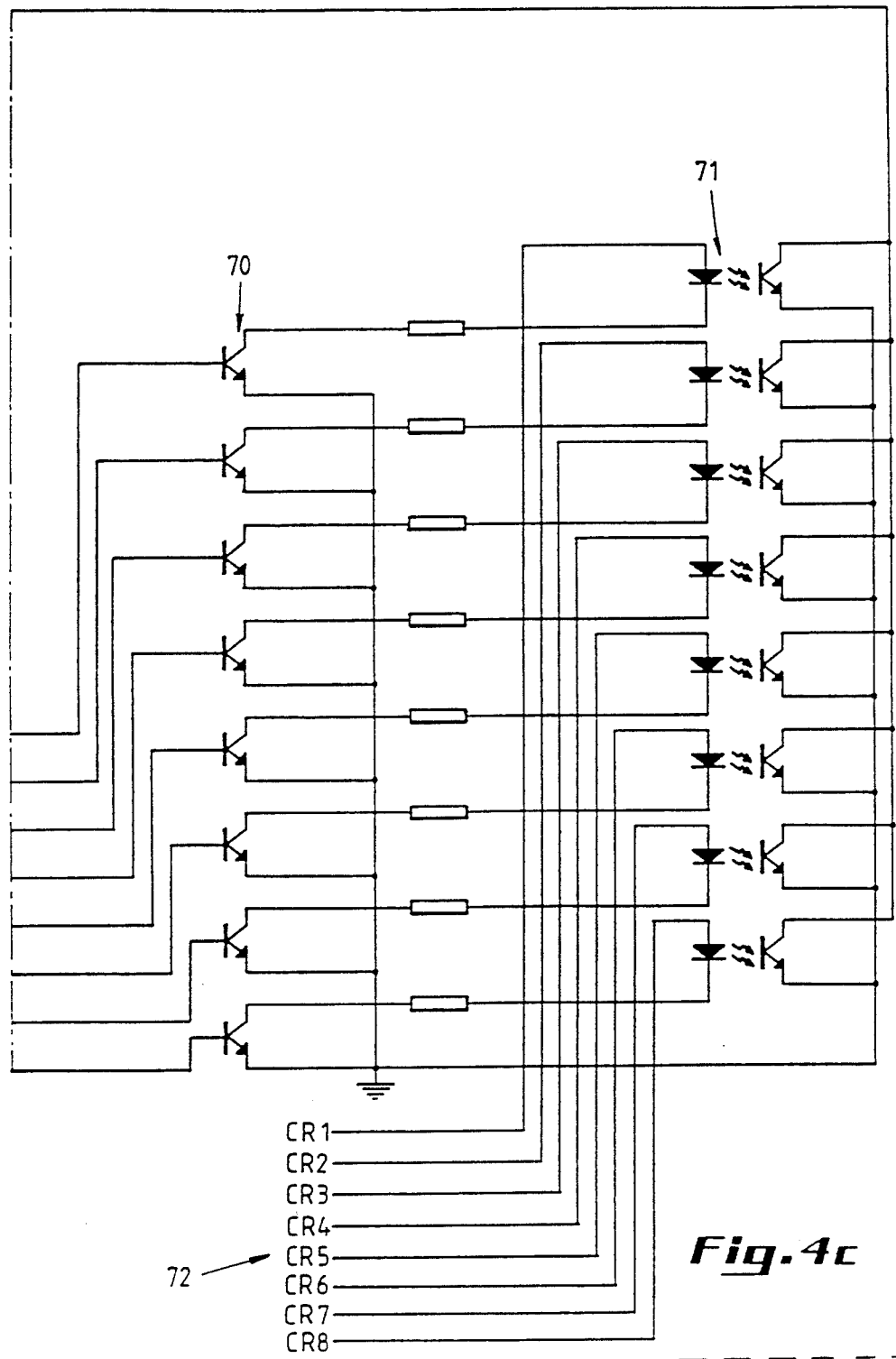

FIG. 3 (consisting of FIGS. 3a, 3b and 3c) shows an exemple of a branching member according to the invention;

FIG. 4 (consisting of FIGS. 4a, 4b and 4c) shows an exemple of a control pulse generator, a scanning member and a comparison member belonging to a switching device according to the invention;

FIG. 5 shows a detail from the second series of switches; and

Figure 6:
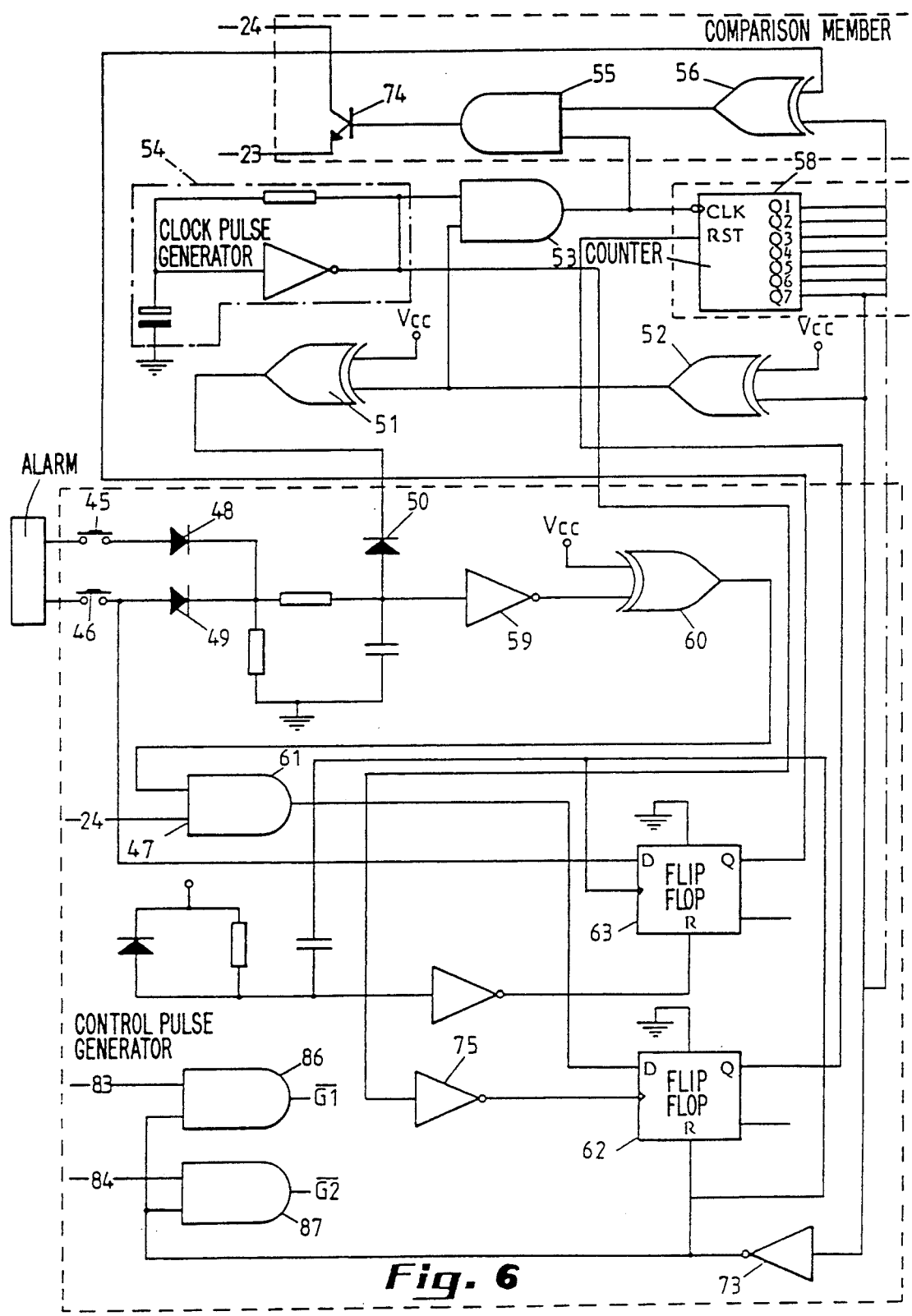

FIG. 6 shows an example of a control pulse generator, a scanning member and a comparison member belonging to a switching device according to the invention as in FIG. 4a, and including an alarm detector.

In the drawings a same reference number is assigned to a same or analogous element.

Figure 1:
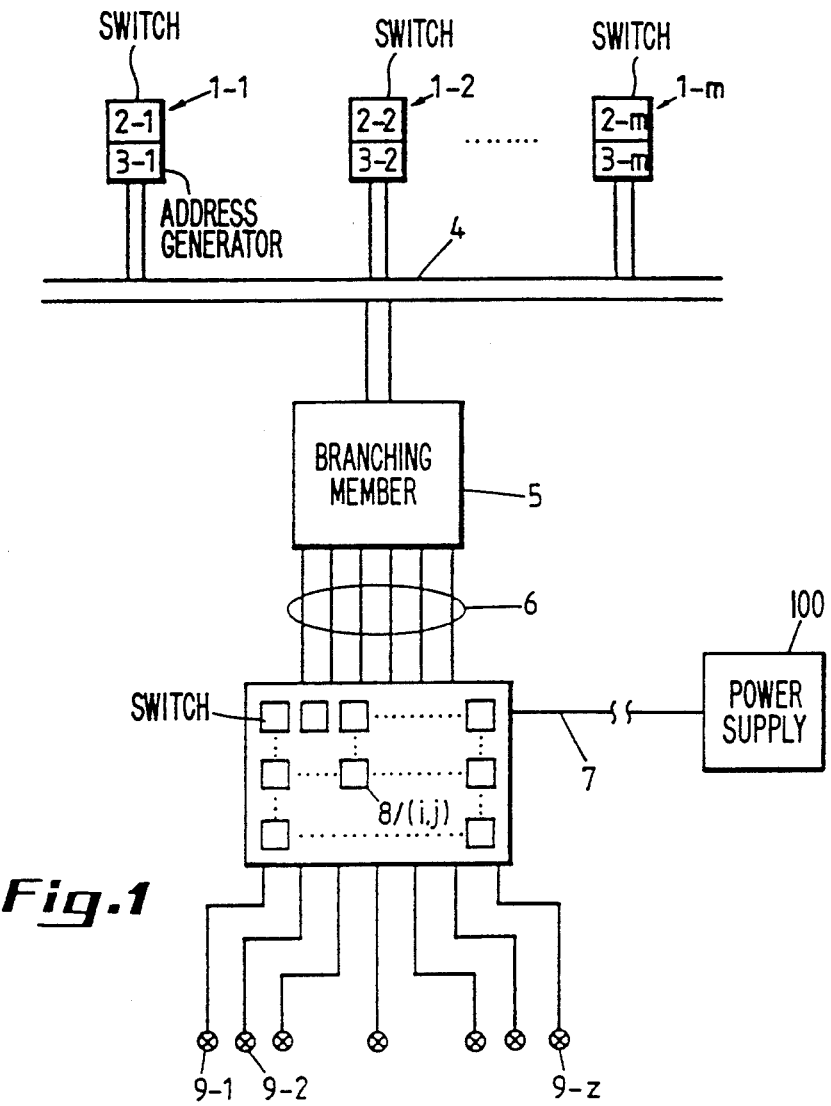
FIG. 1 shows a schematic view of a switching device with units connected thereto according to the invention.

A switching device according to the invention is schematically shown in FIG. 1 and comprises a first series of switches 1-1, 1-2, ... 1-m (m∈ ). The switches 2-1, 2-2, ... 2-m are for example formed by a push-button well known in a building or another monostable switch used to control the switch-on of a light. It will be clear that other types of switches, such as for example touch contacts could also be used. Each switch 2-k ($1 \leq k \leq m$) is each time connected with an address generator 3-k. In FIG. 1 each switch is only connected with one address generator, but it is also possible to connect a plurality of switches with the same address generator.

The address generators are connected with a bus 4, having a number of transmission lines, for example eight. A predetermined number n, for example n=5, is provided for communication between the address generator 3 and the branching member 5. By using such a bus, the whole assembling becomes much more easier because use is made of standard components and connectors. The remaining lines from the bus serve for example for the power supply.

The branching member 5 is provided for collecting the addresses from the address generator 3 and the conversion of the received addresses into matrix addresses for addressing via the transmission line 6 the switches 8 of the second series of switches. The second series of switches comprises a collection of switches which are preferably organized according to the rows (i) and columns (j) of a matrix. The switches 8/(i,j) are preferably formed by teleruptors, for example of the type 312/346512-024 or 312/346511-024 manufactured by Vynckier, and are provided with a pulse switch having a mechanically coupled signal contact. Those switches 8/(i,j) control themselves on electrical current operating units 9-p ($1 \leq p \leq z$) (z=total number of elements) which have to be connected to those switches, those units are for example formed by light points in a building, electrical apparatuses such as alarm systems, computers, the control of a central heating. Those switches 8/(i,j) comprise a further input 7 connected with a power supply 100, for example the mains, and switch that supply towards those units 9-p in order to provide them with the necessary current.

Figure 2:
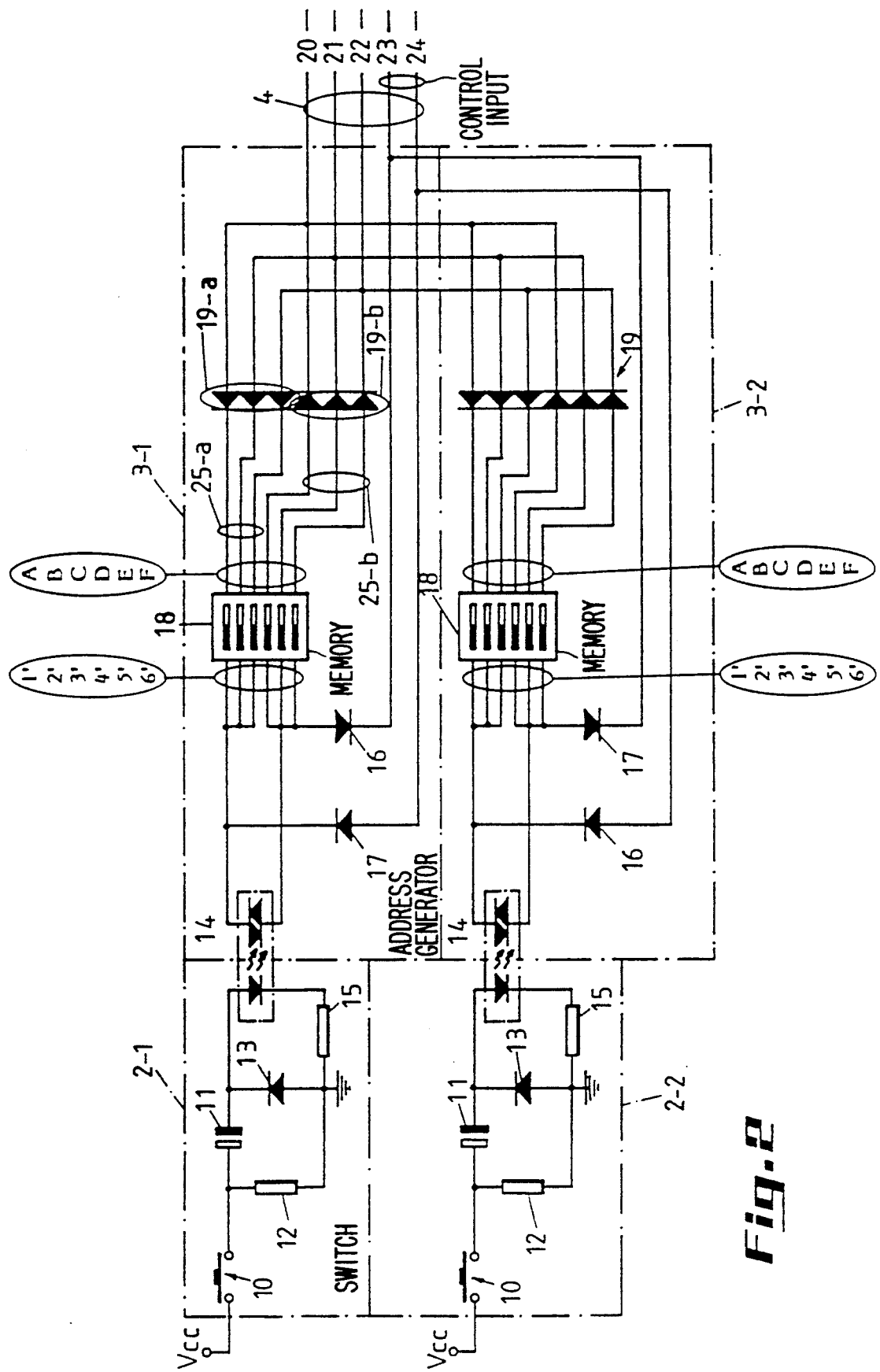
FIG. 2 shows a first series of switches with their address generator.

FIG. 2 shows an example of a first series of switches with their address generator. For the sake of simplicity, only two switches 2 and two address generators 3 have been illustrated in this example, but it will be clear that more switches and address generators can be connected in an identical manner. The switch 10 is, on the one hand, connected with a low voltage supply $V_{cc}$, for example 6 or 12 volts direct current, and, on the other hand, connected with a capacitor 11 and a resistance 12. Parallel with the capacitor 11 and the resistance 12 there is connected a first diode 13. The cathode of the first diode is connected with the anode of a second diode which belongs to an opto-triac 14, for example of the type K3020P manufactured by Telefunken. The anode of the first diode is on the one hand connected to earth and on the other hand, via a resistance 15, with the cathode of the second diode.

The opto-triac 14 enables a galvanic dissociation between a switch 2 and the address generator 3. It will be clear that other connections are possible between the address generator and the switch such as for example a capacitive or inductive connection or as the case may be even a galvanic connection.

The branching of the components 11, 12, 13, 14 and 15 mainly serves to suppress some mechanical disturbances in the switch 10, such as for example the overruling of a switch hold on. The closing of the switch 10 enables a current supplied by source $V_{cc}$ to flow towards the capacitor 11 which causes the latter to be charged. When the capacitor 11 is charged, the latter has to be discharged via the second diode of the opto-triac 14 because the current cannot flow from the capacitor via the first diode 13 towards earth. This causes the opto-triac 14 to be activated and a switching signal to be transmitted towards the address generator. The discharging of the capacitor maintains a current stream in the circuit formed by the components 13, 14 and 15. When now the switch 10 is for example kept-on, this has no consequences for the address generator because it only received a signal via the opto-triac 14 and after charging of the capacitor a current originated from the switch 10 can only flow via resistance 12 towards earth.

The address generator 3 comprises a memory element 18, preferably a programmable memory which enables the programmed address to be modified. That memory element is for example formed by a DIP-switch (Dual In line Package). The address assigned to the switch connected thereto is stored in memory element 18. Thus for example, in the memory element of the address generator 3-1 there is stored the address assigned to switch 2-1. That address corresponds then with a further address assigned to a switch 8 from the second series and thus to an element 9-i. The outputs of that memory element 18 are connected with the bus 4 via transmission lines 25-a, 25-b, wherein diodes 19 are provided. Each line from 25-a, respectively 25-b, is connected with the cathode respectively anode of a diode belonging to the series of diodes 19-a, respectively 19-b. The transmission lines 20, 21 and 22 from bus 4 are each time connected as well with a diode of the series 19-a as with one out of the series 19-b and serve as communication line for the transport of the address. A line 23 respectively 24 from the bus 4 is connected with the cathode respectively anode of a diode 16 respectively 17. In order to describe the operation of the address generator it is necessary to first describe the operation of the branching member.

FIG. 3 (consisting of FIGS. 3a, 3b and 3c) shows an example of a branching member 5 according to the invention. An input of the branching member is connected with the bus 4. The transmission lines 20 to 24 of the bus 4 are connected via a known transmission unit 26 having at least a restoration function, with a first 27 respectively a second 28 flip-flop. A clock input of the first respectively the second flip-flop is connected via the transmission unit 26 with the communication line 24 respectively 23. The outputs 29 respectively 30 ($Q_0$, $Q_1$, $Q_2$) of the first 27 respectively 28 flip-flop transmit the signals present on the communication lines 20, 21 and 23. The input $D_3$ of the first and the second flip-flop is connected with the power supply source $V_{cc}$. The lines 29 respectively 30 are connected with the inputs of a first 31 respectively a second 32 decoder. The decoders are provided for converting a received digital address in a matrix address for addressing the switches 8/(i,j) of the second series of switches 8. The decoder 31 provides the column addressing while the decoder 32 provides the row addressing. The decoders are activated by a signal present on their input D and originating from an output $\overline{Q}_3$ of the first flip-flop 27. The output $Q_3$ of the flip-flop 27 is connected via a diode 33 with a line 34.

An output $\overline{Q}_3$ of the second flip-flop 28 is connected via a diode 35 with a line 34 even as via a line 36 with the basis of a first transistor 37 the collector of which being connected with the voltage supply source $V_{cc}$ and the emitter with a line 24. The line 36 further comprises a branching point 83. That line 36 is the carrier of a row selection signal as will be further described. The line 34 is connected via an inverter 38 with the basis of a second transistor 39, the emitter of which being connected to earth and the collector of which with a line 33. The transistors 37 and 39 form a control signal generator as will be described hereinafter. A branching point 84 is connected with an output $Q_3$ of the second flip-flop 28 and is carrying a column selection signal as will be described hereinafter.

Each output of the decoders 31, respectively 32 is each time connected with a respective gate of one of the MOS-FET transistor 40, respectively 41. The source of each of the MOS-FET transistors 40 is each time connected with the voltage power source $V_{cc}$ while the drain thereof is connected with the addressing line for the addressing of a matrix column (AKS) of the second switches. The source of each MOS-FET transistor 41 is connected with earth and the drain is connected with the addressing line for addressing a matrix row (ARS) of the second switches.

The operation of the branching member 5 and the fetching of the addresses from the address generator 3 will now be described in detail. Under operating conditions the line 24 is normally high because the first transistor 37 is normally conducting. Under being high respectively being low, there will be understood that a signal with a high level or a logic one, for example 12 V., respectively with a low level, or a logic 0, for example 0 V will be present on a line. Indeed, when no signal is present on line 20, there will be also be no signal present at the input $D_3$ of the second flip-flop 28, thus causing the $\overline{Q}_3$ output of the flip-flop 28 to be high and thus to hold transistor 37 conductive via line 36. The voltage supplied by the voltage supply source $V_{cc}$ is thus supplied via transistor 37 to line 24, thus causing a first control signal to be presented to the address generator.

By switching a switch 10, the opto-triac 14 is activated. This causes the signal present on line 24 to be presented via diode 17 and opto-triac 14 to the inputs 4', 5' and 6' of the memory element 18 even as to flow-back via the line 23 to the branching member. The supply of a signal to the address input 4', 5', 6' of the memory element 18 causes that a partial address, namely the bits D, E and F of the generated address are presented via the lines 25-b and the diodes 19 to the lines 20, 21 and 22. Because a signal is now present on line 23, a clock-pulse is generated which is presented to the clock input (CLK) of the second flip-flop 28. The clock signal presented to the flip-flop 28 takes care that the partial address (D, E, F) present on the address lines 20, 21 and 22 is now clocked into the second flip-flop 28. The signal present on the outputs of the second flip-flop 28 is at this level not picked-up by the decoders because the output $\overline{Q}_3$ of the first flip-flop is still high. Flip-flop 27 has not yet been clocked-in.

The clocking-in of flip-flop 28 causes the output $\overline{Q}_3$ of that flip-flop to become low because a high signal is present on input $D_3$. Because $\overline{Q}_3$ now goes low, the signal present on line 36 also goes low causing transistor 37 to be blocked. The fact that $\overline{Q}_3$ goes low also causes this low signal to be supplied via diode 35 to the point P of line 34. Line 34 thus becomes low, causing on its turn that via inverter 38 a high signal is presented to the second transistor 39 causing the latter to become conductive and thus the generation of a second control signal. Because now transistor 37 respectively 39 is blocked respectively conductive, line 24 respectively 23 becomes low respectively is put on earth.

The low level on line 24 and the switching of diode 17, even through the line 23 is grounded and the opto-triac is still activated, now cause an electrical conductive path to be formed between the line 23, diode 16, opto-triac 14 and the address lines 1', 2' and 3' of the memory element 18. This causes that a partial address ABC is generated under control of the second control signal and is supplied via the lines 25-a and diodes 19 to the lines 20, 21 and 22. This causes the second part of the address generated by the address generator 3 to be transmitted towards the branching member. Because a low level is present on line 23, the partial address ABC is transmitted in an inverted manner which has consequences for the switching of the diodes 19-a and the switching at the output of the decoder 31 and at the level of the MOSS-FET's 40.

Because now line 24 is low a clock signal is formed which is supplied at a clock input of the first flip-flop 27. This causes the partial address ABC present at the input of flip-flop 27 to be clocked-in. The high level present at the input $D_3$ of flip-flop 27 now causes the output $\overline{Q}_3$ of flip-flop 27 to go low which causes the decoders 31 and 32 to be activated and thus the transmission of the partial address ABC respectively DEF at the output of the flip-flop 27 respectively 28 towards the decoders, which will convert it then into a matrix address.

The high level at the output $Q_3$ of flip-flop 27 brings the point P on line 34 again at a high level which causes, via inverter 38, a low level signal to be presented on the basis of transistor 39 and thus the blocking of that transistor. Because $Q_3$ of flip-flop 27 is high, $\overline{Q}_3$ is low, causing the reset of the flip-flops 27 and 28. This causing $\overline{Q}_3$ of flip-flop 28 to go high and transistor 37 to become conductive thus restoring the original situation.

The signals at the outputs of the decoders 31 and 32 cause, in function of their level, the transistors 40, 41 to become or not conductive, thus causing the transfer of the matrix address signal.

By using the branching member 5 on the one hand the address generated by the address generator 3 is converted in a matrix address and on the other hand the possibility is created to transmit a 6-bits address with three communication lines. The latter aspect is rendered possible because the 6-bits address is transmitted into two partial addresses of each 3-bits. Without this set-up the address would be limited to a 4-bits address and thus only $2^4$ possible addresses would be available while now $2^6$ addresses are possible. The use of line 23 to transmit a control signal towards the address generator instead of using this line as an address line enables this address extension possibility. It will be clear that the choice of two partial addresses is only a choice in that other possibilities could also be applied, so it would also be possible to chose two lines for a 2-bits control signals and two address lines, in this manner an 8-bits address could then be transmitted by making use of the same bus. Generally it is possible, when n predetermined lines are available in the bus, to chose r ($2 \leq r < n$) lines for the transmission of a control signal, while the $n-r$ remaining lines are used for the address bus. In this manner $2^{r-1}$ control signals can be generated and for each $t^{th}$ ($1 \leq t \leq 2^{r-1}$) control signal a $t^{th}$ part of the address is transmitted. The address transfer capacity is thus extended of a $(n-1)$-bits address to a $[(n-1)+2^{r-1}]$-bits address.

Beside the possibilities of the individual control of the elements it is also possible to control them collectively, namely by switching on or off all elements connected in one and the same operation. That collective on or off switch can for example be controlled by the user himself or by a control pulse generator provided for that purpose and which would be controlled for example by a time-clock or an alarm device.

In order to enable such a collective on or off switching, a switching device according to the invention is provided with a control pulse generator, a scanning member and a comparison member an example of which is given in FIG. 4 (consisting of 4a, 4b and 4c). The control pulse generator comprises further a first 45 respectively a second 46 switching element for generating of a "everything out" or first respectively "everything on" or second control pulse. The first respectively second switching element is connected with the anode of a diode 48 respectively 49; the cathodes of which are connected with an input of an inverter 59 and the anode of a further diode 50. An output of the inverter 59 is connected with a second input of a logic exclusive EX-OR (exclusive OR) gate 60, a first input of which is connected with the voltage supply source $V_{cc}$. An output of the EX-OR gate 60 is connected with a first input of a logic AND-gate 61 having a second input 47 on which the inverted signal present on line 24 is presented. An output of the AND-gate 61 is connected with a D-input of a third flip-flop 62. A Q-output of that flip-flop 62 is connected with a reset input (RST) of a counter 58. A reset input of the third flip-flop 62 is connected via an inverter 73 with an output $Q_7$ of a counter 58. The output of the inverter 73 is further connected with a second input of the logic AND-gates 86, 87. A first input of the logic AND-gate 86 respectively 87 receives the row respectively column selection signal supplied on the point 83 respectively 84. The output of the AND-gate 86 respectively 87 is connected with the $\overline{G}_1$, $\overline{G}_2$ input of a multiplexer 85.

A clock input of the counter 58 is connected with an output of a logic AND-gate 53 a first input of which is connected with the clock pulse generator 54 and a second input of which is connected with an output of a logic EX-OR gate 52 a first input respectively respectively a second input of which is connected with the voltage supply source $V_{cc}$ respectively the $Q_7$ output of the counter 58. The output of the EX-OR gate 52 is further connected with a second input of a further EX-OR gate 51 whose second input is connected with a voltage power supply source $V_{cc}$. An output of the EX-OR gate 51 is connected with the cathode of the diode 50. The output of the AND-gate 53 is further connected with a second input of a logic AND-gate 55 whose first input is connected with an output of a logic EX-OR gate 56. An output of the logic AND-gate 55 is connected with the basis of a transistor 74 whose emitter respectively collector is connected with a line 23 respectively 24.

The second switching element 46 is further connected with a D-input of a fourth flip-flop 63 of which a Q-output is connected with a first input of the EX-OR gate 56. The clock input of the fourth 63 respectively thirdth 62 flip-flop is connected with the output of the inverter 73 respectively via an inverter 75 with the $Q_7$ output of the counter 58 respectively with the clock pulse generator 54.

The counter 58 has outputs $Q_1$, $Q_2$, $Q_3$ and $Q_7$ connected with the inputs A, B, C and D of a third decoder 65. The outputs $Q_1$, $Q_2$ and $Q_3$ are further connected with the $B_1$, $B_2$ and $B_3$ inputs of the multiplexer 85. The outputs $Q_4$ $Q_5$, $Q_6$ and $Q_7$ of counter 58 are connected with the inputs A, B, C and D of a fourth decoder 64. The outputs $Q_4$, $Q_5$ and $Q_6$ are further connected with the inputs $A_1$, $A_2$ and $A_3$ of the multiplexer 85. The inputs $A_4$ and $B_4$ of the multiplexer are connected to earth. The outputs $Q_1$ to $Q_7$ of the third 65 respectively fourth 64 decoder are connected with the respective bases of transistors 69 respectively 70. The collectors of the transistors 69 are connected to the power supply source $V_{cc}$ and the emitters receive via the lines 76 the columns address of the matrix addressing of the second series of switches 8. The emitters of the transistors 70 are connected to earth while their respective collectors are connected with the cathode of the diodes which belong to a series of opto-couplers 71. A signal originating from the rows of the matrix of the second series of switches 8 is presented to the anodes of the diodes from the opto-couplers 71. The collectors of the octo-couplers 71 are connected via an inverter 57 with a second input of the EX-OR gate 56.

The respective outputs of the multiplexer 85 are connected via resistances with the respective bases of the transistors 66, 67 and 68, whose emitters are connected to earth. The collectors of the respective transistors are connected with respective lines 80, 81 and 82 which are further connected with the transmission unit 26 (FIG. 3). The respective lines 80, 81 and 82 correspond with the lines 20, 21 and 22 but transport an inverted corresponding signal. The multiplexer 85 is activated by means of the signals present on the inputs $\overline{G}_1$ and $\overline{G}_2$. Because the logic AND-gates 86, 87 are deblocked by the signal present at the output of the inverter 73 (inversed $Q_7$ of counter 58) the multiplexer 85 is active during the counting of counter 58 and blocked when the counter does not count. The supply of the row and column selection signal 83, 84 takes care of a control synchronized with the multiplexer 85.

Suppose now that a control pulse for the position "everything on" is generated by means of the switching element 46. the counter 58 indicates, after having terminated a counting cyclus, the maximum number, which causes that the line $Q_7$ at the output of the counter is high (logic 1). The high level present on the $Q_7$ output of the counter 58, which is connected with the EX-OR gate 52, takes also care that at the output of the EX-OR gate a logic 0 is supplied which causes the AND-gate 53 to be blocked and the clock signal not to be supplied to the counter. The logic 0 at the output of the EX-OR gate 52 also takes care that the output of EX-OR gate 51 supplies a logic 1 through which the diode 50 is blocked and that a control pulse is supplied by means of the switching element 46 via diode 49 and inverter 59 to the EX-OR gate 60. When the counter counts and thus $Q_7$ being low, the EX-OR gate 51 supplies a logic 0 which causes the diode 50 to become conductive and a control pulse originating from the switching element 45 or 46 not to be supplied to the inverter 59. Thus an inputted control pulse cannot disturb the counting of the counter.

The inverter 59 supplies now a logic 0 to the EX-OR gate 60 causing a logic 1 to be supplied by the latter. This causes that the AND-gate 61 is deblocked and that a logic 1 is supplied at the input D of the third flip-flop 62 because a logic 1 is present at input 47. The Q-output of flip-flop 62 becomes high upon receipt of a clock pulse, which causes counter 58 to be reset. This causes the output $Q_7$ of the counter to become low and the resetting of the flip-flop 62 and further that, via the EX-OR gate 52 and the AND-gate 53, the clock signals are supplied to the counter enabling the latter to start its counting cyclus.

The control pulse supplied by the switch element 46 is presented to the D input of the fourth flip-flop 63 which is clocked by the low level of output $Q_7$ of counter 58 (via inverter 73). Thus as soon as the output $Q_7$ becomes low, the Q-output of flip-flop 63 becomes high and remains high as long as counter 58 has not finished its counting, thus until $Q_7$ becomes high. This causes that during the whole counting cyclus the control signal supplied by the switching element 46 is hold on at the first input of the EX-OR gate 56.

In the case that an "everything off" control pulse for the position "everything off" would be generated by the switching element 45 the same thing would happen with respect to the counter 58 and the flip-flop 62 as described herebefore, indeed the switching elements 45 and 46 are connected in parallel with inverter 59, but a logic 0 would then be presented to the D-input of the fourth flip-flop 63 which would then also be presented at the first input of the EX-OR gate 56. The device thus operates in an analogous manner for a control pulse "everything out" or a control pulse "everything on".

The counter 58 will now supply under the control of clock pulses generated by the clock pulse generator 54 successive counting numbers at its outputs $Q_1$ up to $Q_7$, which counting numbers represent successive addresses. According to this, the counter produces addresses which correspond with those such as generated by the address generator 3, and those addresses are then also supplied via the multiplexer 85 to the lines 80, 81 and 82 of the branching unit and are processed in a manner as described herebefore. Those addresses are now transformed by means of the decoders 64 and 65 into matrix addresses in an analogous manner as described for the decoder 32 and 31.

By the counting of the counter 58 the addresses are generated in a successive manner causing the matrix elements 8-i,j to be successively scanned. A column address supplied to the lines 76 is supplied to the columns 1 (FIG. 5) of the matrix of the second series of switches 7, for example on the mechanically coupled signal contacts which represent the position of the related impulse switch. The output of each mechanically coupled signal contact is provided with a diode 77 in order to prevent interference between the different scanning signals supplied by the counter.

Suppose now that one of the switches from of the $i^{th}$ row and $J^{th}$ column is closed. Each time a high scanning signal is supplied to the $j^{th}$ line 76 of the matrix then, via the switch of the $j^{th}$ column and the $i^{th}$ row, that scanning signal will be conducted through the diode 77 towards the $i^{th}$ line 72 and thus be presented to the anode of the $i^{th}$ diode 71. When now the counter generates the matrix address i,j, then the $i^{th}$ transistor 70 becomes conductive and the scanning signal presented at the anode of the i-diode 71 flows via the $i^{th}$ transistor 70 to earth. This causes the $i^{th}$ octo-coupler 71 to be activated and a logic 1 to be presented at the inverter 57. That logic 1 is converted into a logic 0 by inverter 57 which logic 0 is then presented at the EX-OR gate 56. If now the control pulse "everything on" has been generated then a logic 1 is present on the first input of the logic EX-OR gate causing the output of the EX-OR gate to supply a logic 1 of the first comparison signal, which is then, via AND-gate 56, outputted under control of the clock signal and which will render transistor 74 conductive. Under control of that first comparison signal, line 24 becomes active and the switch i,j remains in its position, because it was on. For the case that an "everything out" control pulse is generated, the EX-OR gate 51 generates a second comparison signal and the line 23 becomes active causing a reset of switch i,j. A same reasoning is valid when an "everything on" control pulse has been generated and when there has been established that switch i,j was not closed, which under those circumstances a logic 1 at the second input of the EX-OR gate 57 causes that the signal i,j will be switched over and thus closed.

I claim:

1. A switching device for an on-off switching of electrical current operable units connectable on a mains, comprising:

a bus having a predetermined number (n) of transmission lines;

branching means, having an address input connected with said bus, said branching means including a control signal generator connected with r of said n transmission lines, where ($2 \leq r < n$), for generating a series of f ($1 < f \leq 2^{r-1}$) control signals for each address received on said address input;

at least one address generator, an address output of which is connected via the n−r remaining transmission lines of said bus to said branching means, having a control input for receiving said control signals;

a series of first switches, each of said first switches having an input connectable to a low tension power supply source and an output connected with a signal input of said at least one address generator; wherein said at least one address generator assigns an address to each of said first switches connected thereto, subdivides said assigned address into f partial addresses, and transmits to said branching means, each time a $t^{th}$ ($1 \leq t \leq f$) control signal is received, a $t^{th}$ partial address; and a series of second switches, each of said second switches corresponding to a respective one of said first switches, each of said second switches having an output on which at least one of said units is connectable and an address input connected to an output of said branching means for receiving a further address therefrom of a corresponding one of said first switches, each of said second switches having a power supply input on which said mains is connectable.

2. A switching device as claimed in claim 1, wherein said number r of transmission lines equals two.

3. A switching device as claimed in claim 1, wherein said second switches are disposed according to a matrix, a matrix address being assigned to each of said second switches indicating a row and a column within said matrix, and wherein said branching means includes converting means for converting a received address into a corresponding matrix address.

4. A switching device as claimed in claim 3, wherein said matrix address comprises a column address and a row address, and wherein said converting means comprises a first and a second respective decoder for converting a received address into said column and said row address.

5. A switching device as claimed in claim 1, wherein said at least one address generator comprises a memory element.

6. A switching device as claimed in claim 5, wherein said memory element comprises a programmable memory.

7. A switching device as claimed in claim 1, wherein said switching device further comprises:
a control pulse generator;
comparison means; and
scanning means;
wherein said control pulse generator generates and supplies at a control signal output first and second respective control pulses for switching all connected units to a first and second position, respectively, said control signal output connected with a control signal input of said scanning means;
wherein said comparison means has a first input connected with said second switches and a control signal input for receiving said first and second control pulses, said comparison means comparing, for each scanned second switch, said scanning pulse with the control pulse presented at said first input, and generating first and second respective comparison signals, indicating correspondence and noncorrespondence, respectively, of the compared pulses, said comparison means activating said branching means with said second comparison signal to switch over the second scanned signal; and
wherein said scanning means has an output connected with said address input of said second switches, said scanning means generating, under control of a received control pulse, a series of scanning signals for sequentially scanning each of said second switches to generate, each time, a scanning pulse representing an actual position of a scanned switch, said scanning member connected with a scanning signal input of said comparison means.

8. A switching device as claimed in claim 7, wherein said scanning means comprises a counter for generating as a scanning signal, subsequent addresses assigned to said second switches.

9. A switching device as claimed in claim 8, wherein said comparison means comprises an EX-OR logic gate having a first gate input connected with said comparison means control signal input and having a second gate input for receiving said scanning pulse.

10. A switching device as claimed in claim 7, wherein said control pulse generator comprises a switching unit.

11. A switching device as claimed in claim 7, wherein said control pulse generator comprises an alarm detector.

* * * * *

UNITED STATES PATENT AND TRADEMARK OFFICE
CERTIFICATE OF CORRECTION

PATENT NO. : 5,321,312
DATED : June 14, 1994
INVENTOR(S) : Willy Rombaut

It is certified that error appears in the above-indentified patent and that said Letters Patent is hereby corrected as shown below:

On title page, item [19] change "Willy" to --Rombaut--. and

Item #76: Change name of Inventor from "Rombaut Willy" to --Willy Rombaut--.

Signed and Sealed this

Sixth Day of September, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,321,312
DATED : June 14, 1994
INVENTOR(S) : Rombaut WILLY

It is certified that error appears in the above-indentified patent and that said Letters Patent is hereby corrected as shown below:

Column 12, line 7, change "first input" to --control signal input--;
Column 12, line 13, change "signal" to --switch--.

Signed and Sealed this

Fourth Day of July, 1995

Attest:

BRUCE LEHMAN

Attesting Officer         Commissioner of Patents and Trademarks